United States Patent [19]

Erickson

[11] Patent Number: 5,054,114
[45] Date of Patent: Oct. 1, 1991

[54] BROADBAND RF TRANSMIT/RECEIVE SWITCH

[75] Inventor: Alan R. Erickson, Cedar Rapids, Iowa

[73] Assignee: Rockwell International Corporation, El Segundo, Calif.

[21] Appl. No.: 249,802

[22] Filed: Sep. 27, 1988

[51] Int. Cl.$^5$ .......................... H04B 1/44; H01P 1/10
[52] U.S. Cl. ...................................... 455/78; 455/82; 455/83; 333/101; 333/103
[58] Field of Search .............................. 455/78, 82, 83; 333/101, 103, 104, 118, 124; 307/139, 140, 241, 242, 256, 259

[56] References Cited

U.S. PATENT DOCUMENTS

| | | | |
|---|---|---|---|
| 4,055,807 | 10/1977 | Priniski et al. | 455/83 |
| 4,229,826 | 10/1980 | Wanzer | 455/83 |
| 4,637,065 | 1/1987 | Ruppel | 455/83 |
| 4,677,688 | 6/1987 | Yoshihara | 455/83 |

FOREIGN PATENT DOCUMENTS 0174534  9/1985  Japan ...................................... 455/83

Primary Examiner—Reinhard J. Eisenzopf
Assistant Examiner—Andrew Faile
Attorney, Agent, or Firm—M. Lee Murrah; V. Lawrence Sewell; H. Fredrick Hamann

[57] ABSTRACT

A broadband PIN diode transmit/receive switch. The switch is used for electrically coupling a single antenna alternately to a transmitter and to a receiver. A first PIN diode for switching is connected between the antenna and an output port of a second order network, an input port of the second order network being connected to an output of the transmitter. A tuned tank circuit has an input port connected to the antenna and has an output port connected to an input of the receiver. A second PIN diode for switching is connected from the output port of the tuned tank circuit to an RF ground. A DC source controls the PIN diodes. When both diodes are forward biased the transmitter is connected to the antenna and is provided a good impedance match over a substantial bandwidth, otherwise the receiver is connected to the antenna.

18 Claims, 1 Drawing Sheet

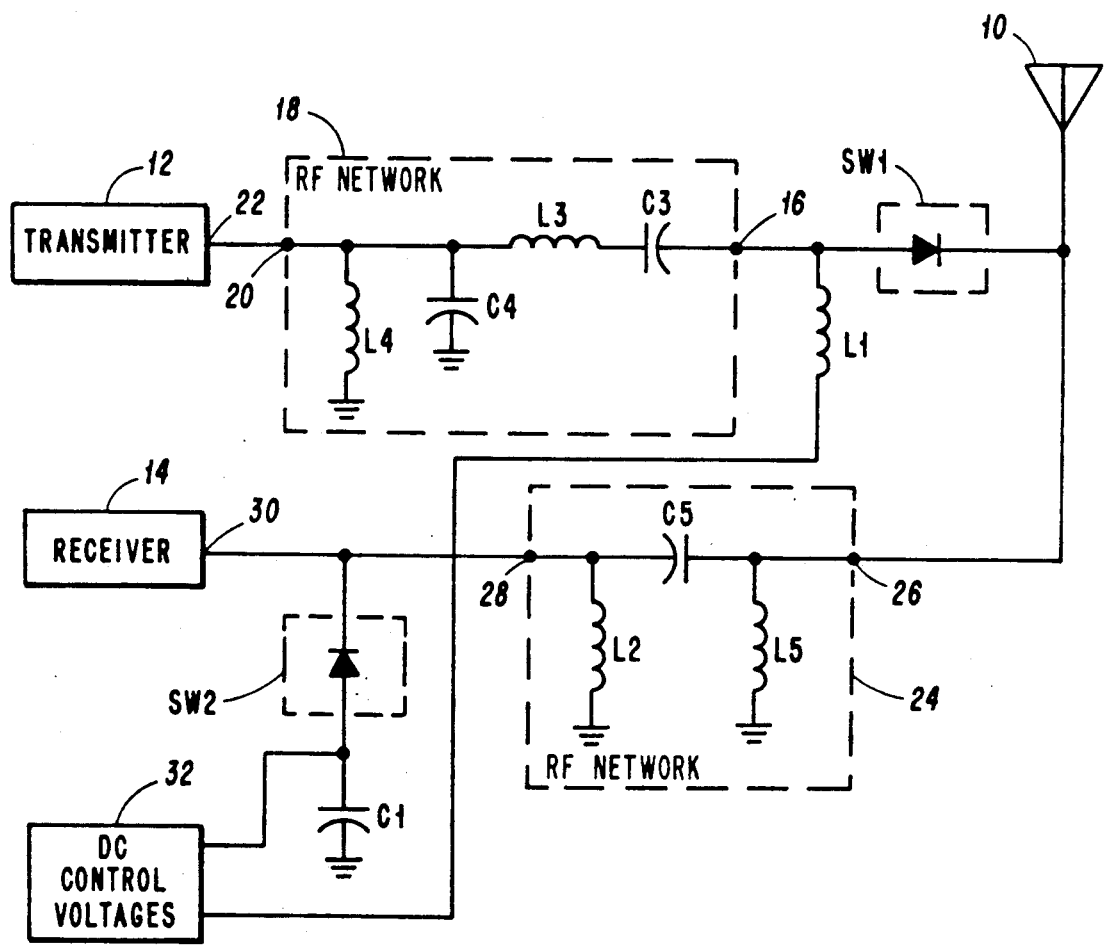

5,054,114

BROADBAND RF TRANSMIT/RECEIVE SWITCH

BACKGROUND OF THE INVENTION

The present invention relates in general to a broadband solid state radio frequency (RF) switch circuit for electrically coupling a common signal path, such as a single antenna, alternately to a transmitter and to a receiver. RF isolation switches using single pole double throw PIN diode switches provide a convenient way for coupling a common signal path to one of a plurality of circuit paths. PIN diode switches being completely electronic are superior in speed and reliability to mechanical relays for such a purpose. Furthermore, it is known in the prior art to use quarter wave length sections to provide signal isolation between the two circuit paths serviced by the same common signal path.

Radio transceivers require that a proper impedance be presented to the transmitter. Prior art circuits utilizing PIN diodes in combination with quarter wavelength transmission lines have been unable to provide this proper impedance over a significant bandwidth, for example 40 to 50 megahertz.

Numerous other circuits are known in the prior art in which the PIN diodes are forward and reversed biased to effect switching of a signal path from a single antenna to a transmitter or receiver. Circuits which use a series diode in the receive path require reverse biasing of the receive diode thus requiring the circuit to supply a significant DC back bias while transmitting. Especially for portable radio transceivers the typically maximum supply voltage is 12 volts or less and thus high voltages for providing diode bias are not available.

The present invention overcomes these drawbacks in the prior art and provides a method for switching a single antenna between a receiver and a transmitter over a wide bandwidth. The invention provides broadband impedance matching not available in the present state of the art and uses solid state circuitry without high voltages for diode biasing.

SUMMARY OF THE INVENTION

The present invention is a broadband solid state RF switch circuit for electrically coupling a coxuaon signal path, such as an antenna, alternately to a transmitter and to a receiver. The switch circuit has a means for providing DC control voltages. A first solid state means for switching is connected between the common signal path and an output port of a means for providing broadband impedance matching during transmit. An input port of the broadband impedance matching means is connected to the output of the transmitter. A means for providing receiver isolation during receive has an input port connected to the common signal path and an output port to an input of the receiver. A second solid state means for switching is connected from the output port of the means for providing receiver isolation during receive to ground. The first and second means for switching are controlled by the means for providing DC control voltages.

The means for providing broadband impedance matching during transmit is a first portion of a bandpass filter and a part of the means for providing receiver isolation is a second portion of the bandpass filter. It is to be understood that the bandpass filter provides the complete broadband impedance matching for the transmitter. The bandpass filter has at least a first and a second tuned tank circuit and in the preferred embodiment a third tuned tank circuit, the first tuned tank circuit being part of the means for providing receiver isolation and the second and third tuned tank circuits being the means for impedance matching.

The means for providing DC control voltages applies the control voltages to both the first and second means for switching to connect the transmitter to the antenna and removes the control voltages from both the first and second means for switching to connect the receiver to the antenna. In a preferred embodiment the first and second means for switching are first and second PIN diodes, respectively. The first PIN diode has one end connected to the input port of the means for providing impedance matching and has its other end connected to the antenna and to the input port of the means for providing receiver isolation. The second PIN diode has one end connected to the output port of the means for providing receiver isolation and has its other end connected to an RF ground. The means for providing DC control voltages applies a DC voltage to the anode of the first PIN diode for forward biasing and also applies a DC voltage to the anode of the second PIN diode for forward biasing. The means for providing DC control voltages produces a DC bias current and the common signal path carries an RF current. When using PIN diodes, the DC bias current for switching the first and second means for switching is substantially less than the RF current being switched between the transmitter and the receiver. The voltage required for a DC bias current during transmit is low. Little or no current is required to back bias the PIN diodes during receive.

BRIEF DESCRIPTION OF THE DRAWING

The features of the present invention which are believed to be novel are set forth with particularity in the appended claims. The invention, together with further objects and advantages, may be best understood by the reference to the following description taken in conjunction with the accompanying drawing, and in which;

The single figure is a circuit diagram of the broadband solid state RF switch of the present invention.

DESCRIPTION OF THE PREFERRED EMBODIMENTS

The present invention has general applicability but is most advantageously utilized in a broadband solid state RF switch circuit for electrically coupling a single antenna alternately to a transmitter and to a receiver. The present invention provides an RF switch circuit for solid state transmit/receive switching over a desired bandwidth without the need for high voltage by using broadband matching techniques. The use of PIN diodes for switching and the use of a lumped element equivalent to a quarter wave transmission line to isolate the receiver from the transmitter is a feature of the present invention. An acceptable impedance is presented to the transmitter over the required bandwidth by the RF switch circuit. In general the circuit provides a broadband impedance match to the transmitter by using a bandpass filter designed specifically for impedance matching, thus enabling operation over the desired band. A novel part of the present invention is that the matching circuit uses part of the lumped elements of the receiver isolation network as an integral part of the design of the impedance matching network. Further, during transmit no high voltage is required for back biasing since the diodes are in an "on" or forward bias condition and the battery voltage of the radio transceiver is adequate for turning on the diodes. During receive the signal level is very low and little or no voltage is required for back bias. Since the receive performance is not sensitive to impedance directly, as is the transmitter, no further broadband matching is required. Thus it can be appreciated that the present invention has a wide range of applications.

Referring now to the drawing of the circuit diagram the broadband RF switch alternately electrically couples a single antenna 10 or common signal path to a transmitter 12 and a receiver 14. A first solid state means SW1 for switching is connected between the antenna 10 and an output port 16 of a RF network 18 which functions as a means for providing broadband impedance matching. An input port 20 of the RF network 18 is connected to an output 22 of the transmitter 12. An RF network 24 provides a means for providing receiver isolation over a predetermined frequency range and has an input port 26 connected to the antenna 10 and an output port 28 connected to an input 30 of the receiver 14. A second solid state means SW2 for switching is connected from the output port 28 of the RF network 24 to an RF ground. A source 32 provides DC control voltages for the first means for switching SW1 via RF decoupling choke L1 and for the second means for switching SW2. Capacitor C1 is a DC blocking capacitor which also provides for an RF ground for the second means for switching SW2.

In the preferred embodiment the switches SW1 and SW2 are solid state PIN diodes and are both closed or "on" (forward biased) during transmit and opened or "off" (reverse biased) during receive. In the circuit no special considerations need to be made to reverse bias the diodes since they handle only receive signal levels when in the off state. If desired, normal radio battery power can be used to provide back bias during receive. During transmit when high voltages are generated by the transmitter, both diodes are on. It can be appreciated that other diode switches can be utilized in the present circuit, but PIN diodes offer the advantage of switching with a DC bias current which is substantially less than the RF current being switched in the circuit.

RF circuit 24 has a property that when properly terminated it has low insertion loss and maintains relatively constant impedance, and when one side is shorted the opposite side is a very high impedance at the desired frequency. RF network 24 can be realized by a quarter wave length of transmission line or as shown in the drawing, by a lumped element equivalent called an inverter. The inverter concept is actually a filter, or part of a filter, and can be extended to any network that can provide a high impedance (parallel resonance) when switch SW2 is in an on state and low insertion loss when SW2 is in an off state. Switch SW2 can also be included inside RF network 24, such as in multisection networks.

RF network 18 is a broadband impedance matching network with the complete impedance matching being achieved by RF network 18 functioning in conjunction with a part of RF network 24 when switch SW2 shorts the output 28 to ground. It provides that transmitter 12 is operated into its specified impedance over the entire bandwidth. The characteristic of the broadband matching network, RF network 18, is such that it provides a very good impedance match in addition to a very low insertion loss between the transmitter and the antenna. This is important because transmitters are sensitive to load impedance due to limitations in power dissipation and distortion.

RF network 18 in the preferred embodiment is a first portion of a bandpass filter. The other portion of the bandpass filter is a part of RF network 24. While the bandpass filter can be of various configurations, in the preferred embodiment a filter with three tuned tanks is used. Two of these tanks form RF network 18 and the remaining tuned tank forms the RF network 24 when it is configured as a parallel resonant tank by switch SW2 being on. At least two tuned tanks are necessary to implement the present invention (RF network 18 can be a single tuned tank). Although more than three tuned tanks can be utilized the additional components have been found to yield minimal improvement. The RF network 18 and 24 can be designed from standard design tables found in the prior art in a manner to minimize return loss (match impedance to the transmitter) over the specified bandwidth. While the filter shown uses lumped elements it is to be appreciated that the same filter topologies can easily be constructed with transmission line sections.

During receive operation of the circuit, switches SW1 and SW2 are "off". The power required for operation is thus negligible. Insertion loss of the antenna 10 through RF network 24 to the receiver 14 is low over the desired bandwidth. The transmitter is isolated from the antenna 10 by switch SW1. If RF network 24 is formed by lumped elements, the usable receive bandwidth is limited by the range of frequencies where insertion loss due to mismatch of RF network 24 is acceptable and is generally at least as wide as the transmit bandwidth. The receive bandwidth is not generally affected by the load impedance directly, only to the extent that the impedance affects insertion loss. For example, a 2:1 VSWR causes only a 0.5 dB insertion loss.

During transmit, switches SW1 and SW2 are "on". The switch SW1 connects transmitter 12 to the antenna 10 through the RF network 18. The short provided by switch SW2 is reflected as a high impedance (parallel resonance at the center of the desired bandwidth) on the antenna 10 by RF network 24, thus isolating the receiver 14 from the transmitter 12 and the antenna 10. RF network 24 and RF network 18 provide low insertion loss and a good impedance match (low return loss) to the transmitter 12 over the design bandwidth which can be an octave or more for a VSWR of 1.3:1 or better. Without RF network 18, a good impedance match to the transmitter is provided only very near the frequency of parallel resonance of capacitor C5 and inductor L5.

In the preferred embodiment, RF network 18 has a series LC circuit composed of inductor L3 and capacitor C3 connected between the output port 16 and the input port 20. In addition inductor L4 and capacitor C4 are connected in parallel from the input port 20 to ground. RF network 24 in the preferred embodiment is composed of capacitor C5 connected between the input port 26 and the output port 28 inductor L5 connected from the input port 26 to ground, and inductor L2 connected from the output port 28 to ground. When switch SW2 is on (transmit mode), output 28 is shorted to ground and inductor L2 is eliminated from the RF network 24. Thus during transmit RF network 24 appears as a resonant tank formed by inductor L5 in parallel with capacitor C5.

The invention is not limited to the particular details of the apparatus depicted and other modifications and applications are contemplated. Certain other changes may be made in the above described apparatus without departing from the true spirit and scope of the invention herein involved. For example, different types of solid state devices and even relays can be used for switches SW1 and SW2. One skilled in the art would be able to provide correct polarity of control voltages for operating the switches according to the present invention. It is intended, therefore, that the subject matter in the above depiction shall be interpreted as illustrative and not in a limiting sense.

We claim:

1. A broadband solid state RF switch circuit for electrically coupling a common signal path alternately to a transmitter in a first branch from the common signal path and to a receiver in a second branch from said common signal path, comprising:

means for providing DC control voltages;

a first solid state means for switching in the first branch connected between said common signal path and an output port of a means for providing broadband impedance matching, an input port of said means for providing broadband impedance matching connected to an output of said transmitter, said means for providing broadband impedance matching being a first portion of a bandpass filter;

means in said second branch for providing receiver isolation having an input port connected to said common signal path and having an output port connected to an input of said receiver, at least a part of said means for providing receiver isolation being a second portion of said bandpass filter;

a second solid state means for switching connected from said output port of said means for providing receiver isolation to at least an RF ground;

said first and second means for switching being controlled by said means for providing DC control voltages.

2. The RF switch according to claim 1 wherein said bandpass filter has at least first and second tuned tank circuits, said first tuned tank circuit being said part of said means for providing receiver isolation and said second tuned tank circuit being said means for impedance matching.

3. The RF switch according to claim 2 wherein said means for providing impedance matching has a third tuned tank circuit and wherein said second and third tuned tank circuits form a second order network.

4. The RF switch according to claim 1 wherein said means for providing DC control voltages applies said control voltages to both said first and second means for switching to connect said transmitter to said common signal path and removes said control voltages from both said first and second means for switching to connect said receiver to said common signal path.

5. The RF switch according to claim 4 wherein said first and second means for switching are first and second PIN diodes, respectively, said first PIN diode having one terminal connected to said output port of said means for providing impedance matching and having its other terminal connected to said common signal path and to said input port of said means for providing receiver isolation, and said second PIN diode having on terminal connected to said output port of said means for providing receiver isolation and having its other terminal connected at least to an RF ground.

6. The RF switch according to claim 5 wherein said means for providing DC control voltages applies a DC voltage across said first PIN diode for forward biasing and also simultaneously applies a DC voltage across said second PIN diode for forward biasing.

7. The RF switch according to claim 6 wherein said means for providing DC control voltages produces a DC bias current and said common signal path carries an RF current and wherein said DC bias current for switching said first and second means for switching is substantially less than said RF current being switched between said transmitter and said receiver.

8. A transmit/receive switch for use in alternately connecting a transmitter and a receiver to an antenna, comprising:

means for providing receiver isolation connected between said antenna and an input of said receiver, a part of said means for providing receiver isolation comprising a first part of a bandpass filter;

means for providing broadband impedance matching connected in series with a first means for switching between said antenna and an output of said transmitter, said means for providing broadband impedance matching comprising a second portion of said bandpass filter; and second means for switching connected between said input of said receiver and ground;

means for supplying control voltages for said first and second means for switching.

9. The transmit/receive switch according to claim 8 wherein said bandpass filter has at least first and second tuned tank circuits, said first tuned tank circuit being said part of said means for providing receiver isolation and said second tuned tank circuit being said means for impedance matching.

10. The transmit/receive switch according to claim 9 wherein said means for providing impedance matching has a third tuned tank circuit and wherein said second and third tuned tank circuits form a second order network.

11. The transmit/receive switch according to claim 8 wherein said means for supplying control voltages applies said control voltages to both said first and second means for switching to connect said transmitter to said antenna and removes said control voltages from both said first and second means for switching to connect said receiver to said antenna.

12. The transmit/receive switch according to claim 11 wherein said first and second means for switching are first and second PIN diodes, respectively, said first PIN diode having one terminal connected to an output port of said means for providing impedance matching and having its other terminal connected to said antenna and to an input port of said means for providing receiver isolation, said second PIN diode having one terminal connected to an output port of said means for providing receiver isolation and having its other terminal connected at least to an RF ground, said input port of said means for providing impedance matching connected to an output of said transmitter and said output port of said means for providing receiver isolation connected to an input of said receiver.

13. The transmit/receive switch according to claim 12 wherein said means for supplying control voltages applies a low DC voltage across said first PIN diode for forward biasing and also simultaneously applies a low DC voltage across said second PIN diode for forward biasing.

14. A broadband solid state RF switch circuit for electrically coupling a single antenna alternately to a transmitter and to a receiver, comprising:
- a first PIN diode for switching connected in series between said antenna and an output port of a second order network, an input port of said second order network connected to an output of said transmitter;
- a tuned tank circuit having an input port connected to said antenna and having an output port connected to an input of said receiver;
- said first PIN diode being further connected in parallel to the output port of the tuned tank circuit;
- a second PIN diode for switching connected from said output port of said tuned tank circuit to an RF ground;
- means for providing DC control voltages to said first and second PIN diodes being controlled by said means for providing DC control voltages to connect said transmitter to said antenna when said control voltages are applied and to connect said receiver to said antenna when said control voltages are removed.

15. The RF switch circuit according to claim 14 wherein said means for providing DC control voltages applies a low DC voltage across said first PIN diode for forward biasing and also simultaneously applies a low DC voltage across said second PIN for forward biasing.

16. The RF switch circuit according to claim 14 wherein said means for providing DC control voltages produces a DC bias current and said antenna carries an RF current and wherein said DC bias current for switching said first and second PIN diodes is substantially less than said RF current being switched between said transmitter and said receiver.

17. The RF switch circuit according to claim 14 wherein said second order network and a part of said tuned tank circuit form a bandpass filter when said first and second PIN diodes are on.

18. An RF switch for alternately connecting a common signal path to a transmitter in a first signal branch of the common signal path and to a receiver in a second signal branch of said common signal path, comprising:
- a first RF network coupled in series in said first signal branch, said first network configured to provide a first portion of an impedance matching network for the transmitter;
- a first solid state switch coupled in series in said first signal branch to selectably connect said first signal branch to said common signal path when said transmitter is active;
- a second RF network coupled in series in the second signal branch, said second network configured to provide both a high impedance for receiver isolation in said second signal branch and to provide a second portion of an impedance matching network for the transmitter when said transmitter is active;
- a second solid state switch coupled in parallel with the receiver and the second RF network for selectably connecting said receiver and said second network to RF ground when said second switch is closed;
- means for providing a control voltage to electrically switch said first and second solid state switches.

* * * * *